(12) United States Patent
First et al.

(10) Patent No.: US 7,457,953 B2
(45) Date of Patent: Nov. 25, 2008

(54) METHOD AND APPARATUS TO PROVIDE SECURE COMMUNICATION

(75) Inventors: Carl L. First, Folsom, CA (US); Jesse R. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 10/742,385

(22) Filed: Dec. 18, 2003

(65) Prior Publication Data
US 2005/0138377 A1  Jun. 23, 2005

(51) Int. Cl.
H04L 9/32 (2006.01)
(52) U.S. Cl. .......................... 713/169; 726/5
(58) Field of Classification Search ................. 713/169; 726/5
See application file for complete search history.

(56) References Cited

U.S. PATENT DOCUMENTS

| 2002/0132603 A1* | 9/2002 | Lindskog et al. ............ 455/343 |
| 2003/0009660 A1 | 1/2003 | Walker |
| 2003/0093663 A1 | 5/2003 | Walker |
| 2003/0226017 A1* | 12/2003 | Palekar et al. ............... 713/168 |
| 2004/0003238 A1 | 1/2004 | Mak et al. |
| 2004/0163008 A1* | 8/2004 | Kim ............................. 714/4 |
| 2005/0032506 A1 | 2/2005 | Walker |
| 2005/0048951 A1* | 3/2005 | Saito .......................... 455/411 |

FOREIGN PATENT DOCUMENTS

| WO | WO 01/82037 A2 | 11/2001 |
| WO | WO 03/096554 A2 | 11/2003 |

OTHER PUBLICATIONS

Comer, Douglas E. Internetworking with TCP/IP, Third Edition. © 1995 Prentice Hall Inc. pp. 199, 200, 221, 326, 327, 578, and 579.*
"Standby & Hibernate Issues in Windows XP" Publication date of May 7, 2002 verified by the Internet Archive. pp. 1-10 http://web.archive.org/web/20020612064040/http://www.kellys-korner-xp.com/xp_standby.htm.*
T. Dierks, C. Allen. RFC2246: The TLS Protocol,Version 1.0. (C)1999 The Internet Society. pp. 1-80.*

(Continued)

*Primary Examiner*—Hosuk Song
*Assistant Examiner*—Thomas Gyorfi
(74) *Attorney, Agent, or Firm*—John F. Travis

(57) ABSTRACT

Briefly, in accordance with an embodiment of the invention, an apparatus and method to provide authentication and secure communication is provided. In one example, the method may include transmitting machine credentials of a first device, wherein the machine credentials are used to authenticate the first device so that the first device is able to communicate with a second device after the first device transitions from a first power state to a second power state in response to a command received by the first device from another device, wherein power consumption of the first device in the first power state is less than the power consumption of the first device in the second power state. The first device may be used in either a wired or wireless network.

9 Claims, 2 Drawing Sheets

OTHER PUBLICATIONS

International Search Report and Written Opinion from PCT/US2004/040140 mailed Apr. 27, 2005, 12 pages.

Walker, Jesse R., "Technique to Establish Wireless Session Keys Suitable for Roaming", U.S. Appl. No. 09/675,262, filed Sep. 28, 2000.

IEEE Std. 802.1X-2001, "Port-Based Network Access Control", 2001, 134 pages.

Intel Corporation, "Wi-Fi Protected Access and Intel Centrino Mobile Technology Deliver a Robust Foundation for Wireless Security", 2003, 10 pgs.

* cited by examiner

METHOD AND APPARATUS TO PROVIDE SECURE COMMUNICATION

BACKGROUND

System designers are continually searching for better ways to provide secure communication by protecting traffic in communication systems. In some systems, authentication and encryption may be used to protect information transmitted between two devices, e.g., between two computing devices in a network or system such as a portable laptop computer and a server. Authentication may refer to the process of determining whether someone or something is, in fact, who or what it is declared to be. After a device is authenticated, encryption keys may be shared between devices to encrypt/decrypt information and provide secure communication between the devices.

In some systems, authentication may be provided by the use of a user password provided by a user. However, one problem that may arise is that authentication may not be possible when a user is not available and secure communication may not be possible if user credentials are needed to negotiate encryption keys to protect the communication link.

Thus, there is a continuing need for alternate ways to provide secure communication in a communication system.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

Figure 1:
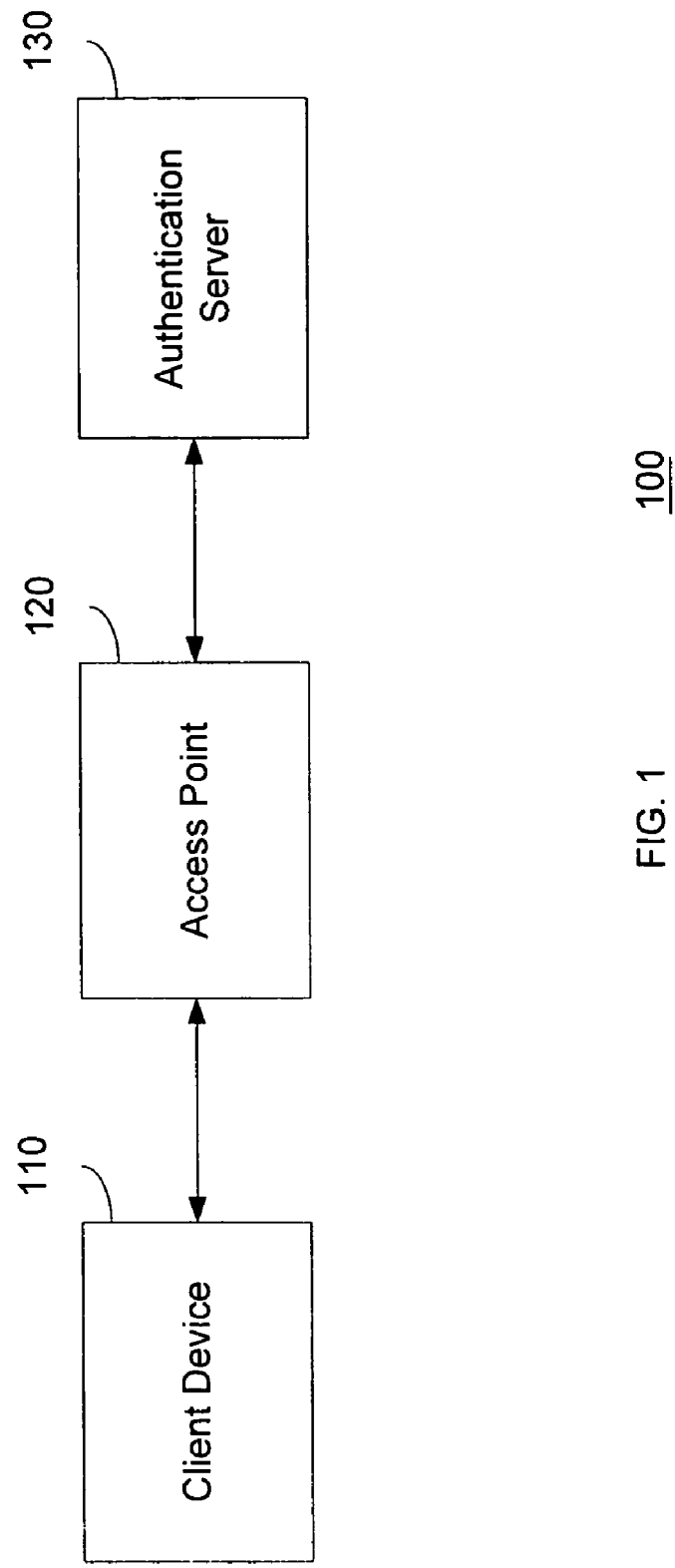
FIG. 1 is a block diagram illustrating a network in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

In the following description and claims, the terms "include" and "comprise," along with their derivatives, may be used, and are intended to be treated as synonyms for each other. In addition, in the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the following description and claims, the term "data" may be used to refer to both data and instructions. In addition, the term "information" may be used to refer to data and instructions.

FIG. 1 is a block diagram illustrating a network 100 in accordance with an embodiment of the present invention. Network 100 may include a client device 110, an access point (AP) 120, and an authentication server 130. As may be appreciated, network 100 may include more components or devices, however, for simplicity, such components and devices are not shown in FIG. 1.

Although the scope of the present invention is not limited in this respect, client device 110 may be a wireless device such as, for example, a personal digital assistant (PDA), a portable computer (e.g., laptop or notebook computer) with wireless capability, a web tablet, a wireless telephone (e.g., cordless or cellular phone), a pager, an instant messaging device, a digital music player, a digital camera, or other devices that may be adapted to transmit and/or receive information wirelessly. Client device 110 may be used in any of the following systems: a wireless personal area network (WPAN) system, a wireless local area network (WLAN) system, a wireless metropolitan area network (WMAN) system, or a wireless wide area network (WWAN) system such as, for example, a cellular system.

An example of a WLAN system includes a system substantially based on an Industrial Electrical and Electronics Engineers (IEEE) 802.11 standard. An example of a WMAN system includes a system substantially based on an Industrial Electrical and Electronics Engineers (IEEE) 802.16 standard. An example of a WPAN system includes a system substantially based on the Bluetooth™ standard (Bluetooth is a registered trademark of the Bluetooth Special Interest Group). Another example of a WPAN system includes a ultrawideband (UWB) system, e.g., a system substantially based on the IEEE 802.15.3a specification.

In other embodiments, client device 110 may not have wireless capability and may be workstation coupled to the network using a wired connection. In various applications, client device 110 may be referred to as a peer device, a supplicant, a wireless device, or a wireless station. In various embodiments, network 100 may be a wired or wireless Ethernet local area network (LAN). If network 100 is a wired network, then the network devices may be coupled to each other using wired connections.

In one embodiment, client device 110 may be a portable computer adapted to transmit and receive information wirelessly using a IEEE 802.11 protocol such as, for example, the IEEE Std 802.11b-1999 standard, published Jan. 20, 2000, although the scope of the present invention is not limited in this respect. Access point (AP) 120 may also be adapted to transmit and receive information wirelessly using a IEEE 802.11 protocol.

Authentication server 130 may be a Remote Authentication Dial-in User Service (RADIUS) server. In one embodiment, client device 110, AP 120, and server 130 may implement authentication by being designed to substantially conform to the IEEE 802.1X standard, published Jul. 13, 2001, although the scope of the present invention is not limited in this respect. In such an embodiment, client device 110 may be referred to as a supplicant and access point 120 may be referred to as a authenticator. Supplicant may refer to a software client running on client device 110.

In one embodiment, authentication may be generally implemented in network 100 as follows: client device 110 may communicate with AP 120 and request to be authenticated, and AP 120 may then transmit the request to authentication server 130. Authentication server 130 may transmit an authentication challenge to client device 110 via AP 120. That is, to authenticate client device 110, server 130 may transmit a challenge to AP 120 and AP 120 may then transfer the challenge to client device 110. Credentials may be transmitted from client device 110 to server 130 in response to the challenge. If server 130 authenticates the credentials sent by client device 110, then server 130 may authorize client device 110 to communicate on the network. For example, server 130 may open a network port to allow client device 110 to communicate with other devices in network 100.

In alternate embodiments, e.g., in a wired network, access point 120 may not be included and authentication server 130 and client device 110 may communicate directly, or indirectly by another network device, to authenticate client device 110, although the scope of the present invention is not limited in this respect. In another embodiment, network 100 may include an authentication device wherein the authentication device serves as both the authenticator and the authentication server. For example, network 100 may include an authentication device that may comprise access point 120 and authentication server 130.

Network 100 may have physical or logical network ports. Logical ports may also be referred to as virtual ports. Devices such as client device 110 may be coupled to these ports, and the network ports may be opened or closed to allow communication between devices in the network. For example, after a device coupled to a network port is authenticated, the device may be authorized and the network port may be "opened" to allow the device to communicate with other devices via or through the opened port. Conversely, if a device coupled to a network port is not authenticated, the port may be "closed" to block or prevent communication to and from the unauthenticated device.

In one embodiment, both user authentication and machine authentication may be used in network 100. In other words, authentication may be provided in network 100 using both user credentials (e.g., a user password of a user of client device 110) and machine credentials (e.g., machine identification such as a serial number stored in client device 110 that may be used to uniquely identify client device 110). For example, authenticating client device 110 may include using user credentials at certain times and using machine credentials at other times. Other examples of machine credentials may include some type of keying material or certificate.

In one embodiment, if client device 110 transitions to an active power state (e.g., an "awake" state) from an inactive power state (e.g., a low power state) in response to user input received by client device 110, user credentials of a user of client device 110 may be transmitted to server 130 from client device 110 in response to an authentication challenge from server 130, although the scope of the present invention is not limited in this respect.

Examples of a low power state may include a sleep, a hibernate, a suspend or a standby state. Client device 110 may consume relatively more power when in the awake state compared to when its in the sleep, hibernate, suspend, or standby state. The awake state may also be referred to as a high power, higher power, or active state and the sleep, hibernate, suspend, and standby states may be referred to as low power, lower power, or inactive states.

User input may include any input received by client device 110 that indicates that a user is present. Examples of user input may include keyboard input, mouse movement, a mouse click, etc. In one embodiment, client device 110 may transition from an awake state to a low power state after a period of inactivity that may indicate that a user is not present. The period of inactivity may be determined using "time-out" counters. In addition, user input may cause a power state transition, e.g., a shutdown into a hibernate state.

If client device 110 transitions to an awake state from a low power state in response to something other than user input, e.g., a power transition command such as, for example, a wake-up command received by client device 110 from another, different device in network 100 (not shown), machine credentials of client device 110 may be transmitted to server 130 from client device 110 in response to an authentication challenge from server 130. Examples of wake-up commands may include a network wake-up request transmitted to client device 110. This may occur, for example, when a system administrator "pushes" a software patch to client device 110. In this example, a user may not be present to authenticate client device 110 and in this example, machine credentials stored in client device 110 may be used to authenticate client device 110 so that client device 110 may transmit and receive information to and from other devices in network 100. Other examples of wake-up commands from other network devices may include a peer wake-up command and a remote wake-up command and these commands may be referred to as external commands since they may be generated by a device external to client device 110.

Using machine credentials when a user is not present may allow protection of traffic with operations such as remote wake-up, peer-to-peer wake-up, or alerting by a client. Remote or network wake-up may allow a management console that is connected within a LAN (or that can establish a connection to the LAN via a wide area network (WAN) connection) to perform maintenance functions or remote control on personal computers (PCs) that are connected to the LAN, but may or may not be powered on at the time. In peer-to-peer networking, clients may share their resources with other clients attached to the LAN. A wake-up command may be used so that resources of all peers may be available and shared even if some clients enter into a standby state. Alerting may include generating alert messages that allow a client, e.g., a PC or workstation, to signal to a management console that some problem exists with its physical or operational environment, for example, overheating, fan stopped, power supply problems, etc. It may be advantageous to allow these operations after a device has entered into a standby state and no user is present, while not sacrificing secure communication. As stated above, this may be achieved by the use of machine credentials for authentication when no user credentials are available.

In some embodiments, different encryptions keys may be used based on whether machine credentials or user credentials are provided for authentication, although the scope of the present invention is not limited in this respect.

In one embodiment, when client device 110 is in a user-operated awake state, an "awake" encryption key may be used to cryptographically protect information transferred between client device 110 and other devices of network 100. The awake key may be based on the credentials from the user of client device 110.

As client device 110 transitions to a low power state, e.g., a sleep state, it may negotiate for another encryption key that may be referred to as a "sleep" key. This sleep key may be based on the machine credentials of client device 110. If client device 110 is awaken using a network wake-up command or request from another device, and no user is present, traffic between client device 110 and other devices in network 100 may be protected using the sleep key.

If client device 110 transitions from the sleep state to the awake state by user interaction (e.g., a key stroke, mouse movement, mouse click, etc.), client device 110 may drop the sleep key and request the user to present user credentials for negotiating an awake key.

If client device 110 transitions from the sleep state to the awake state by a network wake-up command, client device 110 may continue to protect traffic using the sleep key, until there is any user interaction (e.g., keyboard input, mouse movement, mouse click), at which time client device 110 may drop the sleep key and request the user to negotiate for a new awake key using the user credentials. If client device 110 transitions back to the sleep state by, e.g., system inactivity determined by a system time-out, then client device 110 may negotiate a new sleep key.

In alternate embodiments, rather than using different encryption keys (e.g., a sleep key and an awake key), the same encryption key may be used regardless of whether client device 110 transitions from a lower power state to a higher power state in response to either a network wake-up command or user input.

Figure 2:
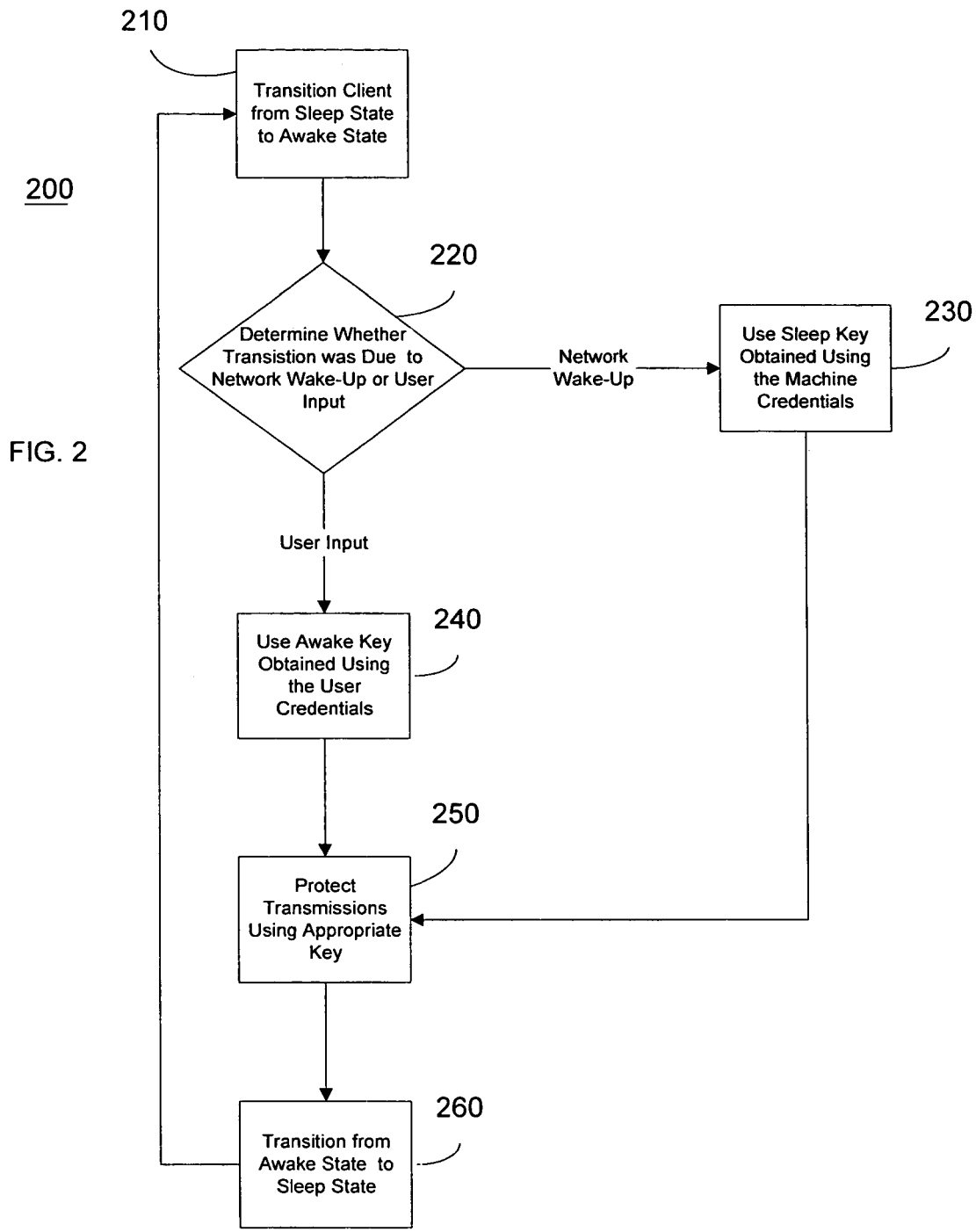
FIG. 2 is a flow diagram illustrating a method to provide authentication and secure communication in accordance with an embodiment of the present invention.

Turning to FIG. 2, what is shown is a flow diagram illustrating a method 200 to provide authentication and secure communication in accordance with an embodiment of the present invention. Method 200 may be used in network 100 discussed above with reference to FIG. 1. Method 200 may include transitioning client device 110 from a sleep state to an awake state of operation (block 210). After transitioning to an awake state, it may be determined whether the power state transition was due to a network wake-up command from another network device or user input from a user of client device 110 (diamond 220).

If it is determined that the transition was due to a network wake-up command, then machine credentials of client device 110 may be used to authenticate client device 110 to network 100. Further, these machine credentials may be used to obtain or select a sleep key that may be used to encrypt transmissions from client device 110 and decrypt transmissions received by client device 110 (block 230).

If it is determined that the transition was due to client device 110 receiving user input from a user of client device 110, then the user credentials of the user of client device 110 may be used to authenticate client device 110 to network 100. Further, these user credentials may be used to obtain an awake key that may be used to decrypt/encrypt transmissions to and from client device 110 (block 240).

Transmissions between client device 110 and other devices of network 100 may be protected using the appropriate encryption key that is selected based on the wake-up event, e.g., either a network wake-up or user input (block 250). Next, client device 110 may transition to the sleep state from the awake state by, e.g., a user command or due to system inactivity (block 260).

Accordingly, as discussed above, methods, apparatuses, and systems have been provided to provide authentication and secure communication. In one embodiment, a method may comprise receiving a request from client device 110 to access network 100 through a network port, transmitting a challenge to client device 110 that is coupled to the network port, and then receiving machine credentials of client device 110, wherein client device 110 is attempting to gain access or authorization to network 100 via the network port. The method may further comprise opening the network port to allow communication between client device 110 and another network device (not shown) of network 100 through the network port if the machine credentials are authenticated by authentication server 130 of network 100.

In this embodiment, the method may further comprise closing the network port to block communication from client device 110 to another network device if the machine credentials are not authenticated. The machine credentials may be used to authenticate client device 110 if no user credentials are available from a user of the client device. The method may further comprise using a sleep key to decrypt information received from client device 110 if the machine credentials are authenticated, if client device 110 transitions from a lower power state (e.g., a standby state) to a higher power state (e.g., an awake state) in response to a command received by client device 110 from another device, and if no user of client device 110 is available.

In this embodiment, the method may further comprise receiving an indication that a user of client device 110 is present, transmitting a challenge to client device 110, receiving user credentials in response to the challenge, and allowing communication between the network device and the client device through the network port if the user credentials are authenticated. The method may further comprise using an awake key to decrypt information received from client device 110 if the user credentials are authenticated and if client device 110 transitions from a lower power state (e.g., a standby state) to a higher power state (e.g., an awake state) in response to input from the user received by client device 110.

In another embodiment, a method may include transmitting machine credentials stored in client device 110 from client device 110 to authentication server 130 in response to receiving an authentication challenge from authentication server 130, wherein client device 110 is coupled to a physical or logical port of network 100. The method may further comprise transmitting information from client device 110 to the port only if authentication server 130 authenticates the machine credentials, and client device 110 receiving information from another device of network 100 through the port only if authentication server 130 authenticates the machine credentials.

The method may further comprise using the machine credentials to obtain a sleep key to protect traffic between client device 110 and network 100 through the port. The sleep key may be used after the client device transitions from a sleep state to an awake state by something other than user input.

In another embodiment, a method may comprise transmitting machine credentials of client device 110 from client device 110 to authentication server 130, wherein the machine credentials are at least used to authenticate client device 110 so that client device 110 is able to communicate with another device (not shown) of network 100 after client device 110 transitions from a lower power state to a higher power state in response to a power transition command received by the first device from a different network device external to the first device and prior to client device 110 receiving input from a user. The power consumption of client device 110 operating in the lower power state is less than the power consumption of the client device 110 in the second power state. As an example, the lower power state may be a standby state and the higher power may be an awake state. Authentication server 130 may receive the machine credentials, authenticate the machine credentials, and determine whether to authorize client device 110 to communicate with another network device (not shown) of network 100 based on the machine credentials.

As an example, client device 110 may include circuitry (not shown) to implement the operations of the method of this embodiment. For example, client device 110 may comprise one or more processors, non-volatile and/or volatile memory, input/output (I/O) devices, a wireless transceiver, and an antenna, although the scope of the present invention is not limited in this respect In this embodiment, the method may further comprise transmitting user credentials of a user of client device 110 from client device 110 to authentication server 130, wherein the user credentials are used to authenticate the client device 110 so that client device 110 is able to communicate with another network device (not shown) after client device 110 transitions from a lower power state to a higher power state in response to receiving user input from the user of the first device, wherein the user input indicates that the user is present to provide the user credentials.

In this embodiment, the method may further comprise using an awake encryption key to encrypt information transmitted from client device 110 and decrypt information received by client device 110. The awake encryption key may be based on the user credentials and may be used if the first device transitions from the lower power state to the higher power state in response to user input received by client device 110 indicates that the user is present.

In this embodiment, the method may further comprise using an encryption key other than the awake key to encrypt information transmitted from client device 110 and decrypt information received by client device 110. This encryption key may be based on the machine credentials and may be used if client device 110 transitions from the lower power state to the higher power state in response to the power transition command received by client device 110 from another network device.

In this embodiment, the method may further comprise transitioning client device 110 from the higher power state to the lower power state, wherein the transmitting of the machine credentials from client device 110 may occur after determining that client device is to transition from the higher power state to the lower power state. In one example, the transmitting of machine credentials may occur prior to client device 110 transitioning from the higher power state to the lower power state. In another example, the transmitting machine credentials may occur after the first device begins transitioning from the higher power state to the lower power state and prior to client device 110 reaching the lower power state.

In this embodiment, client device 110 may be coupled to a network port of network 100 and the method may further comprise transmitting information from client device 110 to another network device via the network port if authentication server 130 authenticates the machine credentials of client device 110. The method may further comprise receiving information from another network device through the network port if authentication server 130 authenticates the machine credentials.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
    determining a first encryption key to use in communicating with a wireless device;
    using the first encryption key to wirelessly communicate with the wireless device;
    determining a second encryption key to use in communicating with the wireless device;
    entering a low power mode subsequent to said determining the first and second encryption keys;
    awakening from the low power mode subsequent to said entering; and
    determining a third encryption key to communicate with the wireless device subsequent to the awakening if the awakening is in response to a user-initiated action, and otherwise using the second encryption key to communicate with the wireless device subsequent to the awakening.

2. The method of claim 1, wherein the low power mode is a mode selected from a list consisting of: a sleep mode, a hibernate mode, a suspend mode, and a standby mode.

3. The method of claim 1, wherein the user-initiated action is selected from a list consisting of: a keyboard input, a mouse click, and mouse movement.

4. The method of claim 1, wherein the third key is based on user credentials.

5. An apparatus, comprising a wireless communications device to:
    determine a first encryption key to use in communicating with a wireless device;
    use the first encryption key to wirelessly communicate with the wireless device;
    determine a second encryption key to use in communicating with the wireless device;
    enter a low power mode subsequent to said determining the first and second encryption keys;
    awaken from the low power mode subsequent to said entering; and
    determine a third encryption key to communicate with the wireless device subsequent to the awakening if the awakening is in response to a user-initiated action, and otherwise use the second encryption key to communicate with the wireless device subsequent to the awakening.

6. The apparatus of claim 5, wherein the low power mode is a mode selected from a list consisting of: a sleep mode, a hibernate mode, a suspend mode, and a standby mode.

7. The apparatus of claim 5, wherein the user-initiated action is selected from a list consisting of: a keyboard input, a mouse click, and mouse movement.

8. The apparatus of claim 5, wherein the third key is based on user credentials.

9. The apparatus of claim 5, wherein the apparatus is substantially compliant with the Institute of Electrical and Electronics Engineers (IEEE) 802.1X standard, published in July 2001.

* * * * *